United States Patent [19]
Bononi

[11] 4,443,073
[45] Apr. 17, 1984

[54] DEVICE FOR LENS BOWS OF EYEGLASSES

[76] Inventor: Walter H. Bononi, Zeppelinstrasse 9, Fellbach-Schmiden, Fed. Rep. of Germany

[21] Appl. No.: 205,568

[22] Filed: Nov. 10, 1980

[30] Foreign Application Priority Data

Nov. 14, 1979 [DE] Fed. Rep. of Germany ....... 2945905

[51] Int. Cl.³ .............................................. G02C 1/08
[52] U.S. Cl. .......................................... 351/98; 351/90
[58] Field of Search ................................ 351/90–102, 351/141, 153, 154

[56] References Cited

U.S. PATENT DOCUMENTS

| | | | |
|---|---|---|---|
| 362,377 | 5/1887 | Hammel | 351/95 |
| 1,580,117 | 4/1926 | Clulee | 351/102 |
| 1,800,263 | 4/1931 | Nerney | 351/98 |
| 1,800,279 | 4/1931 | Boutelle | 351/99 |
| 3,941,461 | 3/1976 | Lambert | 351/95 |
| 4,243,305 | 1/1981 | Elder | 351/153 |

FOREIGN PATENT DOCUMENTS 12794 6/1916 United Kingdom ................. 351/98

Primary Examiner—F. L. Evans
Attorney, Agent, or Firm—M. Robert Kestenbaum

[57] ABSTRACT

A lens bow has a first area with a through hole oriented approximately in the direction of mechanical tension in the bow when it holds a lens set therein, and a second area with an inside threaded sleeve aligned with the through hole. The first and second areas have opposed faces. A screw has a head which rests outside the first area and which is tightened into the inside threaded sleeve to bring the first and second areas towards each other to hold the lens in the lens bow. The shortest distance between the opposed faces are larger in the untightened state and smaller when the screw is tightened to bring the bow into a holding condition about the circumference of a lens set therein.

8 Claims, 5 Drawing Figures

DEVICE FOR LENS BOWS OF EYEGLASSES

The invention concerns a device to reduce the inner circumference of metal lens bows, the lens bows having a first area which has a through hole running approximately in the direction of the mechanical tension in the lens bow, and the lens bows having a second area that has an inside thread aligned with the through hole and with a screw whose head rests on the outside of the first area and whose outside thread is screwed into said inside thread, whereby the two areas are brought close enough to each other to permit a lens set into the lens bows to be held at its outer circumference. In many eyeglasses the lens bows are made entirely of metal. In other glasses metal serves only as the actual frame for the lens whereas plastic parts make up the aesthetic component.

BACKGROUND OF THE INVENTION

In glasses with plastic lens bows the inner circumference can be enlarged in that the lens bows are heated and thermal expansion dilates the inner circumference. Subsequent cooling permits the inner circumference to shrink again and the lenses are then held firmly regardless of temperature and mode of employment. In the case of metal lens bows the metal section is separated in the region of the hinge and two small metal blocks are soldered to its two ends, this unit comprising the sealing block. The two halves have guides which align when the screw is tightened. This screw traverses the two halves in longitudinal direction. One half has an inside thread whereas the other half has a through boring for the shaft of the screw. When the screw is tightened the two opposing surfaces of the sealing block rest upon one another, which is the maximum tightening point of the screw.

The lenses must, therefore, be precision-ground at the outer edge. For this purpose every manufacturer supplies with every eyeglass model a sample lens whose circumference is copied on the actual lens. Although this copying technique is highly developed and a multitude of copy lenses are maintained in stock, it does sometimes happen that the outer circumference of the lens is ground down too far. For this case thin plastic strips have been developed which are placed into the holding groove of the bow and which are known under the name "Optiker-Trost" [Optician's relief]. The very high requirement of precision is, of course, reflected in the price and the use of Optiker-Trost is only a poor remedy for incorrectly ground lenses.

OBJECT AND STATEMENT OF THE INVENTION

The purpose of the invention is to provide a device which permits the requirements as to precise grinding to be less stringent, which is inexpensive and aesthetic, and which is not revolutionary and permits lenses to be still usable even where Optiker-Trost has failed.

According to the invention the solution lies in that the shortest effective distance between the joint faces of the first and second area opposing each other is larger than it will be when the screw is tightened to the actual circumference of the lens.

Advantageously, the invention includes the following additional features:

The second area has a sleeve provided with the inside threaded portion and the face of the sleeve forms one of the opposed faces. A longer thread is obtained and the screw may be correspondingly shorter. The sleeve covers the helical ridges of the screw from the outside for the greatest part of the screw. The distance between the first and the second area can nevertheless be kept relatively large.

The sleeve is of circular-cylindrical design. This permits use of mass-manufactured spare parts and the sleeve is, therefore, inexpensive.

The sleeve is the screw shaft with an inside thread. It is unnecessary to solder on or otherwise attach the sleeve, only a through hole being needed in the appropriate area. In addition, the connection can also be tightened from the shaft side.

The sleeve is rigidly joined to the second area. This is most recommendable when the area relating to the sleeve is so thin that a through bore cannot be provided and a countersink for the screwhead cannot be created. This solution is also suitable where no screwheads can be used and only smooth, continuous surfaces are needed.

The device is part of a hinge portion which acts together with a second hinge portion that is arranged on the eyeglass temple. This allows costs to be further reduced because one of the hinge halves can be assembled simultaneously with the device.

The device is arranged on the bridge of eyeglasses. This permits the lateral part of the lens to be manufactured in one seamless piece; there is no mechanism at this aesthetically important location.

The screw is inserted from the underside of the bridge. The screw is practically invisible in this case.

The first and the second areas are angled seamless continuations of the lens bow. No separate first and second areas are needed, but the lens bow as such may serve for this purpose.

The two areas in terms of flexional principle are the legs of a U. Thus, the flexional principle is readily apparent.

DESCRIPTION OF THE DRAWINGS

The invention is now described on the basis of exemplified embodiments.

In the drawing.

DETAILED DESCRIPTION

Figure 1:
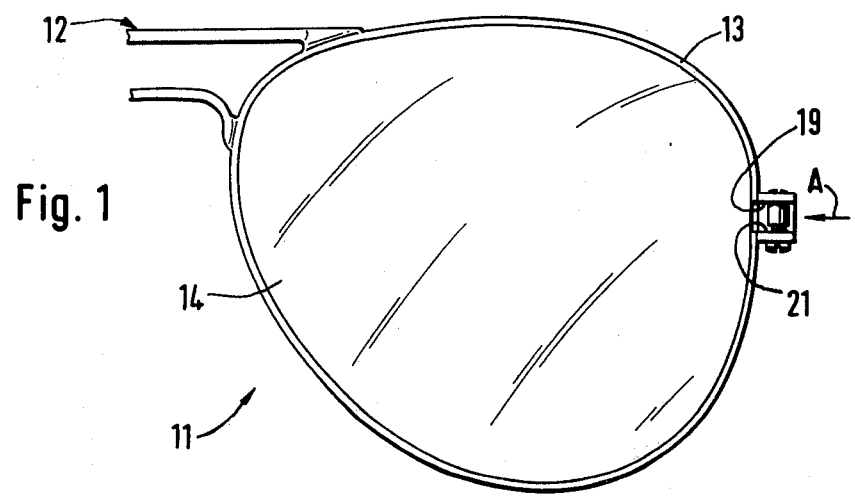
FIG. 1 is the front view of the left part of the eyeglasses.

Eyeglasses 11 have a bridge 12 to which a metal lens bow 13 is soldered. Lens bow 13 holds a lens 14 at whose outer circumference two chamfers 16, 17 are cut which meet at a burr 18. According to this V-structure the inside circumference of lens bow 13 has a V-groove.

At approximately 3 o'clock at the level of the invariably necessary hinge, lens bow 13 changes into upper end surface 19 and lower end surface 21. The distance between these is approximately 5 mm, thus other than in the sealing-block technique are unable to come in contact with one another.

Figure 2:
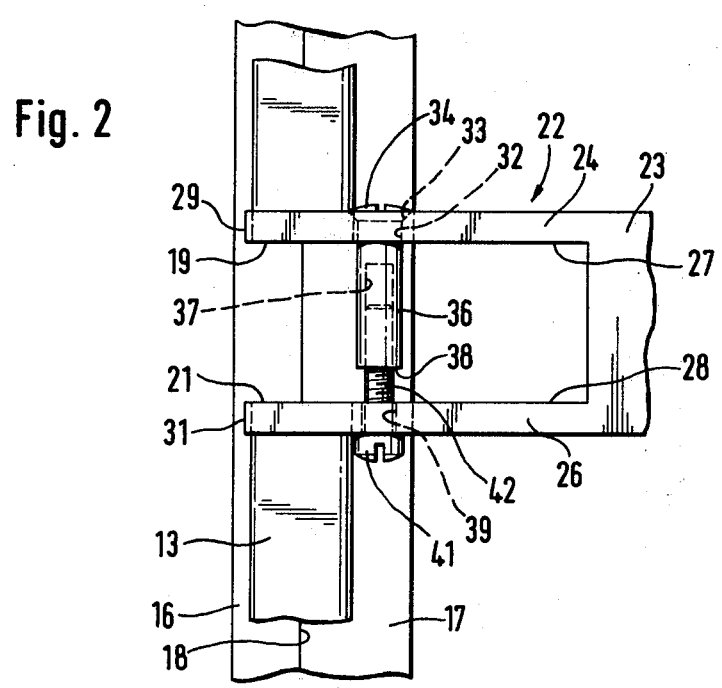
FIG. 2 is a view per arrow A in FIG. 1, greatly enlarged, with the first and second areas.

A U-shaped part 22 braces a cross yoke 23 which, at the right in FIG. 2, changes into a standard hinge-half not shown here in detail. Above cross yoke 23 changes into left-pointing leg 24 with I-profile, and below, cross yoke 23 changes into another such leg 26. Both legs 24, 26 are of equal length and as shown in FIG. 2 are butt-soldered in their left-end region to lens bow 13 in such a way that inner surface 27, 28 of each leg 24, 26 is aligned flush with end surface 19, 21. As seen in FIG. 2, left interface 29, 31 of legs 24, 26 is allowed to protrude somewhat to the left beyond lens bow 13. There is an approximate 5 mm clearance between inner surfaces 27, 28.

A through boring 32 is provided near interface 29 in leg 24, which in its upper portion has a depression 33 for a lens head 34. This lens head 34 continues below in the form of a circular cylindrical sleeve 36, which traverses a through boring 32 and projects vertically into the space between inner surfaces 27, 28. Sleeve 36 has a blind hole tapping 37. At its lower end, sleeve 36 has an annular face 38.

Leg 26 has a through bore 39 positioned coaxially to through bore 32. On the outer surface of leg 26 is a cylinder head 41 of a screw whose shaft 42 which has an outside thread is screwed into blind tapping 37. There is a distinct, approximately one-millimeter clearance between face 38 and inner surface 28.

With respect to material composition, width and length, legs 24, 26 are made such that they can be bent outward and inward to a certain degree without suffering damage. This degree is determined by the level of chamfers 16, 17 over which lens bow 13 should be able to slide. Face 38 always has a distance from inner surface 28 (insofar as the screw consisting of cylinder head 41 and shaft 42 is tightened to a specified tension). This specified tension could be created with a sort of dynamometric key.

Figure 3:
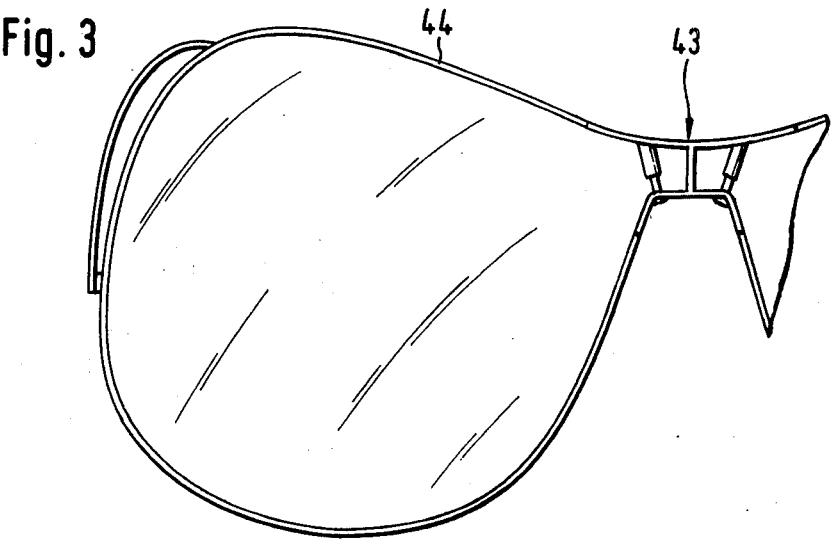
FIG. 3 is the frontal view of the right part of the filigree ladies' eyeglasses.
Figure 4:
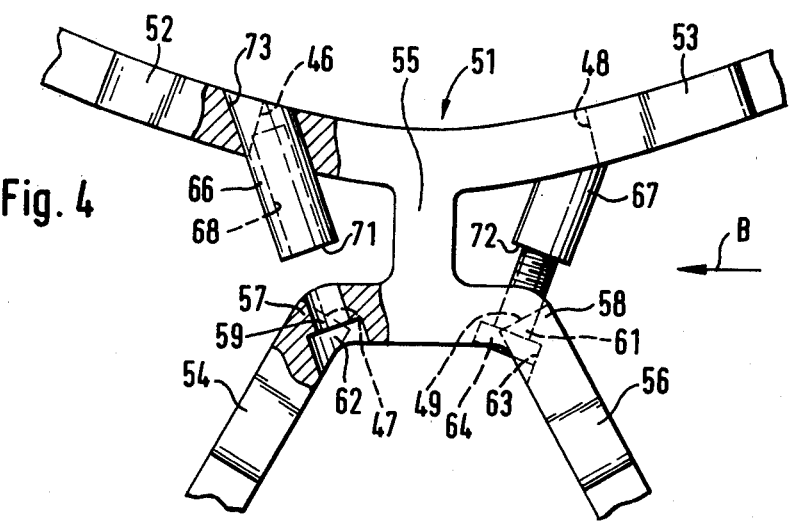
FIG. 4 is the considerably enlarged, broken-off and partially broken open frontal view of the bridge section.
Figure 5:
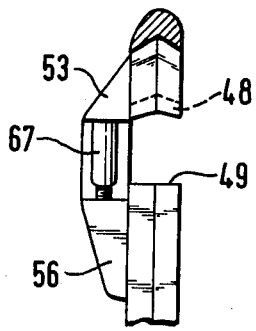
FIG. 5 is a view per arrow B from FIG. 4.

In a second exemplified embodiment, the device according to the invention is arranged in the area of bridge 43. As shown in FIG. 3, there is ample opportunity to satisfy aesthetic preferences in designing the eyeglasses because the lens bow 44 if free of disturbing thickenings and structures. Lens bow 44 of this lady's model is very thin. Viewed from the front it has the appearance of a continuous figure 8, but ends with faces 46, 47, 48, 49. A wing bridge 51 is soldered in front of lens bow 44 and faces 46, 49 considerably overlapping these. Seen in detail it has a left upper wing 52, a right upper wing 53, a left lower wing 54, a right lower wing 56 and a centrally linking, one-piece vertical connection 55.

Wings 54, 56 have an approximate 60° bent region 57, 58. A through boring 59, 61, proceeding obliquely upward to the right and to the left, is provided which in the bend below changes to cylinder head gasket 62, 63. These cylinder head gaskets 62, 63 are recessed in such a way as to allow a cylinder head 64 resting in them to barely protrude or not at all protrude beyond the bend.

In coaxial position to through bores 59, 61 are sleeves 66, 67 of circular cylindrical design with tapping 68 that is open-ended below and that is inserted in a blind hole. Lower face 71, 72 clears the opposing surface of bent region 57, 58 by approximately 1 mm. The upper end of sleeve 66, 67, is rigidly soldered into oblique boring 73 of wings 52, 53 and trimmed so as to prevent any protrusion above.

It is possible to make the design such that no further measures are necessary. However, one may add a decorative piece in front of wing bridge 51 which may somewhat camouflage the structure or one may apply a plastic coating between wings 52, 54 or between wings 53, 56.

What is claimed is:

1. Device to reduce the inner circumference of metal lens bows, comprising
   a lens bow having a first area with a through hole oriented approximately in the direction of the mechanical tension in said lens bow, and a second area having an inside threaded portion aligned with said through hole,
   said first and second areas having opposed faces thereon,
   a sleeve on said second area provided with said inside threaded portion and having a face which forms one of said opposed faces,
   a screw having a head resting on the outside of said first area, which is tightened into said inside threaded portion to bring said first and second areas towards each other, up to a point at which said lens bow holds a lens set in said lens bow, at the outer circumference of the lens, with said opposed faces on said first and second areas being spaced from each other,
   the shortest effective distance between said opposed faces on said first and second areas being larger in the untightened state and smaller when said screw is tightened to bring said bow into a holding condition about the lens circumference,
   said first and second areas comprising legs of a U-shaped profile that provide a bending characteristic, to hold said bow about said lens circumference in accordance with the flexion principle, and
   an eyeglass bridge associated with said lens bow, having said first and second areas of said device arranged thereon.

2. Devices according to claim 1, wherein said screw is tightened into said threaded portion from the underside of said bridge.

3. Device to reduce the inner circumference of metal lens bows, comprising
   a lens bow having a first area with a through hole oriented approximately in the direction of the mechanical tension in said lens bow, and a second area having an inside threaded portion aligned with said through hole,
   said first and second areas having opposed faces thereon,
   a sleeve on said second area provided with said inside threaded portion and having a face which forms one of said opposed faces,
   a screw having a head resting on the outside of said first area, which is tightened into said inside threaded portion to bring said first and second areas towards each other, up to a point at which said lens bow holds a lens set in said lens bow, at the outer circumference of the lens, with said opposed faces on said first and second areas being spaced from each other,
   the shortest effective distance between said opposed faces on said first and second areas being larger in the untightened state and smaller when said screw is tightened to bring said bow into a holding condition about the lens circumference,
   said first and second areas comprising legs of a U-shaped profile that provide a bending characteristic, to hold said bow about said lens circumference in accordance with the flexion principle, and said first and second areas comprising angled, seamless continuations of said lens bow.

4. Device according to claim 3 wherein said sleeve is of circular-cylindrical form.

5. Device according to claim 4 wherein said sleeve is a screw shaft with an inside thread.

6. Device according to claim 4, wherein said sleeve is rigidly joined to said second area.

7. Device according to claim 3, wherein said device is part of a first hinge portion which cooperates with a second hinge portion arranged on the eyeglass temple.

8. Device according to claim 3, comprising yoke means that permanently connect together said first and second areas.

* * * * *